United States Patent [19]

Doi et al.

[11] Patent Number: 5,104,428
[45] Date of Patent: Apr. 14, 1992

[54] SEPARATION MEMBRANE

[75] Inventors: Toru Doi; Tomohiro Ishikawa, both of Yokkaichi; Takayuki Otsu, Nara; Akikazu Matsumoto, Sakai, all of Japan

[73] Assignee: Tosoh Corporation, Yamaguchi, Japan

[21] Appl. No.: 722,471

[22] Filed: Jul. 2, 1991

[30] Foreign Application Priority Data

Jul. 4, 1990 [JP] Japan .................. 2-175287

[51] Int. Cl.$^5$ .................. B01D 53/22; B01D 71/64
[52] U.S. Cl. .................. 55/158; 55/16; 55/68
[58] Field of Search .................. 55/16, 68, 158

[56] References Cited

U.S. PATENT DOCUMENTS 4,954,144  9/1990  Burgoyne, Jr. et al. .......... 55/158 X

FOREIGN PATENT DOCUMENTS

| 0315981 | 5/1989 | European Pat. Off. | 55/16 |
| 62-068519 | 3/1987 | Japan | 55/158 |
| 1-080421 | 3/1989 | Japan | 55/158 |
| 1-236918 | 9/1989 | Japan | 55/16 |

Primary Examiner—Robert Spitzer
Attorney, Agent, or Firm—Nixon & Vanderhye

[57] ABSTRACT

A separation membrane comprising a resin being constituted of the repeating unit represented by the general formula (I) and having a number average molecular weight of not less than $1 \times 10^3$ in polystyrene equivalent:

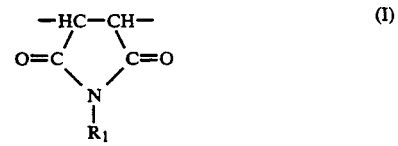

(I)

wherein $R_1$ denotes an alkyl group of 1-20 carbons, a fluoroalkyl group of 1-20 carbons, or a group represented by the general formula: $-(-X-)_m-(SiR_2R_3-)_n-R_4$, or $-(-X-)_m-(-SiR_2R_3O-)_n-SiR_4R_5R_6$ (wherein X is an alkylene group of 1-8 carbons or a phenylene group of 6-12 carbons; m is 0 or 1; n is an integer of 1-20; $R_2$, $R_3$, $R_4$, $R_5$, and $R_6$ are respectively a group, having 1-8 carbons, selected from an alkyl group, a cycloalkyl group, a phenyl group, an alkoxyl group, and a fluoroalkyl group, and may be the same with or different from each other).

1 Claim, No Drawings

SEPARATION MEMBRANE

BACKGROUND OF THE INVENTION

1. Field of the Invention

The present invention relates to a separation membrane which is superior in gas permeability, heat resistance, durability, and membrane-forming property.

2. Description of the Related Art

Polymer membranes for separation and concentration of substances have been studied comprehensively for the purpose of energy saving, effective utilization of resources, and so forth.

High polymer materials are generally known to allow gases to pass through. However, the permeability thereof is usually low, and varies greatly depending on the permeating substances. In particular, the materials showing oxygen permeation coefficient ($PO_2$) of higher than $1\times10^{-9}$ $cm^3(STP).cm/cm^2.sec.cmHg$ are limited to only few substances such as polydimethylsiloxane, poly(4-methylpentene-1), polyphenylene oxide, poly[1-(trimethylsilyl)-1-propyne], and the like.

Of the above substances, poly[1-(trimethylsilyl)-1-propyne] is known to have the highest permeation coefficient among organic high polymers. This substance, however, involves disadvantages of remarkable aging deterioration, low heat stability, low durability, low permeation selectivity, and so forth.

On the other hand, the above-mentioned polydimethylsiloxane, which has low glass transition temperature and high gas permeability, involves disadvantages such that the substance per se has low mechanical strength and is lacking in membrane-forming property.

After comprehensive studies, it was found that a membrane comprising a certain N-substituted maleimide polymer has high gas permeability, high heat resistance, high durability, and superior membrane-forming property, and thereby the present invention has been completed.

Generally, N-substituted maleimide polymers are known to have high glass transition temperature and high heat decomposition temperature and to give a material superior in thermal properties. The investigations have been made mostly on N-aromatic-substituted maleimides. These maleimide polymers, however, are brittle and inferior in moldability.

It was found by the inventors of the present invention that the introduction of a flexible group as the N-substituent gives a polymer which is improved in brittleness and which gives a membrane having satisfactory mechanical strength and yet having high gas permeability.

SUMMARY OF THE INVENTION

The present invention intends to provide a separation membrane which is superior in gas permeability, heat resistance, durability, and membrane-forming property.

The present invention provides a separation membrane comprising a resin being constituted of the repeating unit represented by the general formula (I) and having a number average molecular weight of not less than $1\times10^3$ in polystyrene equivalent:

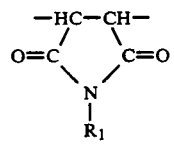

where $R_1$ denotes an alkyl group of 1-20 carbons, a fluoroalkyl group of 1-20 carbons, or a group represented by the general formula: $-(-X-)_m-(-SiR_2R_3-)_n-R_4$, or $-(-X-)_m-(-SiR_2R_3O-)_n-SiR_4R_5R_6$ (wherein X is an alkylene group of 1-8 carbons or a phenylene group of 6-12 carbons; m is 0 or 1; n is an integer of 1-20; $R_2$, $R_3$, $R_4$, $R_5$, and $R_6$ are respectively a group, having 1-8 carbons, selected from an alkyl group, a cycloalkyl group, a phenyl group, an alkoxyl group, and a fluoroalkyl group, and may be the same with or different from each other). Detailed Description of the Preferred Embodiment:

The compounds which give the repeating unit (I) include N-methylmaleimide, N-ethylmaleimide, N-n-propylmaleimide, N-isopropylmaleimide, N-n-butylmaleimide, N-isobutylmaleimide, N-t-butylmaleimide, N-n-hexylmaleimide, N-n-octylmaleimide, N-n-decylmaleimide, N-laurylmaleimide, N-n-dodecylmaleimide, N-n-tetradecylmaleimide, N-n-hexadecylmaleimide, N-stearylmaleimide, N-n-icosylmaleimide, N-trifluoromethylmaleimide, N-trimethylsilylmaleimide, N-dimethyl-t-butylsilylmaleimide, N-(3-diethylmethylsilylpropyl)maleimide, N-(3-dimethylethoxysilylpropyl)maleimide, N-(3-triethoxysilylpropyl)maleimide, N-(3-trimethoxysilylpropyl)maleimide, N-(4-trimethoxysilylphenyl)maleimide, N-2,2,2-trifluoroethylmaleimide, N-2,2,3,3-tetrafluoropropylmaleimide, N-2,2,3,4,4,4-hexafluorobutylmaleimide, N-$\beta$-(perfluorooctyl)ethylmaleimide, and the like. These compounds may be used singly or in combination of two or more thereof.

In the polymer of the present invention, an additional vinyl monomer may be copolymerized within the range in which the object of the present invention is achievable. The additional vinyl monomer includes styrene, $\alpha$-methylstyrene, vinyltoluene, 1,3-butadiene, isoprene, and their halogenated derivatives; methacrylic esters such as methyl methacrylate, ethyl methacrylate, cyclohexyl methacrylate, phenyl methacrylate, and benzyl methacrylate; acrylic esters such as methyl acrylate, ethyl acrylate, butyl acrylate, cyclohexyl acrylate, phenyl acrylate, and benzyl acrylate; vinyl esters such as vinyl acetate, and vinyl benzoate; vinyl ethers such as methyl vinyl ether, ethyl vinyl ether, propyl vinyl ether, and butyl vinyl ether; vinyl chloride, vinylidene chloride, maleic anhydride, N-phenylmaleimide, N-carboxyphenylmaleimide, acrylonitrile, ethylene, propylene, 1-butene, 2-butene, isobutene, and 1-hexene, or a combination of two or more thereof.

These monomers may be polymerized by any known polymerization method such as radical polymerization and anionic polymerization.

The polymerization may be conducted by any known polymerization process including bulk polymerization, solution polymerization, suspension polymerization, and emulsion polymerization, among which solution polymerization is particularly preferable.

The initiator for radical polymerization includes organic peroxides such as benzoyl peroxide, lauryl peroxide, octanoyl peroxide, acetyl peroxide, di-t-butyl peroxide, t-butylcumyl peroxide, dicymyl peroxide, t-butyl peroxyacetate, and t-butyl peroxybenzoate; and azo type initiators such as 2,2'-azobis(2,4-dimethylvaleronitrile), 2,2'-azobis(2-butyronitrile), 2,2'-azobisisobutyronitrile, dimethyl-2,2'-azobisisobutylate, and 1,1'-azobis(cyclohexane-1-carbonitrile).

The initiator for anionic polymerization includes alkali metals, organic alkali metals such as butyllithium, sodium naphthalene, Grignard reagents such as phenylmagnesium bromide, and the like.

The solvent useful in the solution polymerization includes benzene, toluene, xylene, ethylbenzene, cyclohexane, dioxane, tetrahydrofuran, acetone, methyl ethyl ketone, dimethylformamide, isopropyl alcohol, butyl alcohol, 1,1,2-trichloro-1,2,2-trifluoroethane, and the like.

The polymerization temperature is suitably determined depending on the decomposition temperature of the initiator. Generally the polymerization is conducted preferably in the range of from 40° to 150° C.

The number-average molecular weight (Mn) of the resulting polymer can be measured by gel permeation chromatography (GPC). The molecular weight of the resin of the present invention is preferably not less than $1 \times 10^3$, more preferably in the range of from $1 \times 10^4$ to $5 \times 10^6$. The polymers having molecular weight of less than $1 \times 10^3$ tend to make the resulting membrane brittle.

The separation membrane according to the present invention shows an oxygen permeation coefficient of not less than $1 \times 10^9$ measured at 40° C., a $PO_2/PN_2$ ratio of not less than 1.5, preferably not less than 2.0, and a glass transition temperature of not lower than 60° C., preferably not lower than 80° C.

The resin prepared in the present invention may be used mixedly with other resins if necessary.

The resin of the present invention may be formed into membrane by usual membrane forming process such as casting, spin coating, and compression molding.

The present invention is described by reference to examples without limiting the invention thereto in any way.

The melting point (Tm) and the glass transition temperature (Tg) of the resulting polymer were measured in nitrogen atmosphere at a temperature elevation rate of 10° C./min by means of DSC200 (made by Seiko Denshi K.K.).

The heat decomposition temperature (Td) of the resulting polymer was measured in nitrogen atmosphere at a temperature elevation rate of 40° C./min by means of TG/DTA200 (made by Seiko Denshi K.K.).

The molecular weight of the resulting polymer was measured by means of GPC (HLC-802A, made by Tosoh Corporation) with standard polystyrenes for calibration.

EXAMPLE 1

34.9 g (1.0 mol/l) of N-stearylmaleimide, 82 mg ($5.0 \times 10^{-3}$ mol/l) of 2,2'-azobisisobutyronitrile (AIBN), and 100 ml of benzene were placed in a 200-ml autoclave equipped with a stirrer, a nitrogen-introducing tube, a thermometer, and a degassing tube. After the autoclave was purged with nitrogen several times, the reaction was allowed to proceed at 60° C. for 2 hours.

The reaction mixture was poured into ethanol to deposit the formed polymer. The polymer was purified by reprecipitation from benzene-ethanol, and was dried at a reduced pressure at 60° C. for 24 hours. The yield of the polymer was 68%.

The resulting polymer had a molecular weight (Mn) of 200000. From this polymer, a thin membrane of 50 μm thick was prepared by casting a solution of the polymer in chloroform.

The characteristics of the polymer and the permeation coefficients of oxygen and nitrogen in the membrane are shown in Table 1.

EXAMPLE 2

26.5 g (1.0 mol/l) of N-laurylmaleimide, 82 mg ($5.0 \times 10^{-3}$ mol/l) of 2,2'-azobisisobutyronitrile (AIBN), and 100 ml of benzene were placed in the autoclave described in Example 1. After the autoclave was purged with nitrogen several times, the reaction was allowed to proceed at 60° C. for 5 hours.

The reaction mixture was poured into ethanol to deposit the formed polymer. The polymer was purified by reprecipitation from benzene-ethanol, and dried at a reduced pressure at 60° C. for 24 hours. The yield of the polymer was 75%.

The molecular weight (Mn) of the resulting polymer was 175000. From this polymer, a thin membrane of 50 μm thick was prepared by casting of the solution of the polymer in chloroform.

The characteristics of the polymer and the permeation coefficients of oxygen and nitrogen in the membrane are shown in Table 1.

EXAMPLE 3

20.1 g (1.0 mol/l) of N-octylmaleimide, 82 mg ($5.0 \times 10^{-3}$ mol/l) of 2,2'-azobisisobutyronitrile (AIBN), and 100 ml of benzene were placed in the autoclave described in Example 1. After the autoclave was purged with nitrogen several times, the reaction was allowed to proceed at 60° C. for 5 hours.

The reaction mixture was poured into ethanol to deposit the formed polymer. The polymer was purified by reprecipitation from benzene-ethanol, and dried at a reduced pressure at 60° C. for 24 hours. The yield of the polymer was 86%.

The molecular weight (Mn) of the resulting polymer was 171000. A thin membrane of 50 μm thick was prepared by casting of the solution of the polymer in chloroform.

The characteristics of the polymer and the permeation coefficients of oxygen and nitrogen in the membrane are shown in Table 1.

EXAMPLE 4

18.1 g (1.0 mol/l) of N-hexylmaleimide, 82 mg ($5.0 \times 10^{-3}$ mol/l) of 2,2'-azobisisobutyronitrile (AIBN), and 100 ml of benzene were placed in the autoclave described in Example 1. After the autoclave was purged with nitrogen several times, the reaction was allowed to proceed at 60° C. for 5 hours.

The reaction mixture was poured into ethanol to deposit the formed polymer. The polymer was purified by reprecipitation from benzene-ethanol, and dried at a reduced pressure at 60° C. for 24 hours. The yield of the polymer was 81%.

The molecular weight (Mn) of the resulting polymer was 132000. From this polymer, a thin membrane of 50 μm thick was prepared by casting of the solution of the polymer in chloroform.

The characteristics of the polymer and the permeation coefficients of oxygen and nitrogen in the membrane are shown in Table 1.

As is obvious from the above description, the present invention readily gives a separation membrane which is superior in gas permeability, heat resistance, durability and membrane-forming property.

TABLE 1

| | Thermal Properties | | | Gas Permeability | | | |
|---|---|---|---|---|---|---|---|
| | Tm (°C.) | Tg (°C.) | Td (°C.) | Measurement Temperature (°C.) | $PO_2^{1)} \times 10^9$ | $PN_2^{2)} \times 10^9$ | $\alpha^{3)}$ |
| Example 1 | 20 | 98 | 441 | 20 | 1.43 | 0.54 | 2.66 |
| | | | | 30 | 2.39 | 1.02 | 2.34 |
| | | | | 40 | 4.63 | 2.02 | 2.29 |
| Example 2 | −39 | 114 | 425 | 20 | 2.95 | 1.19 | 2.48 |
| | | | | 30 | 3.60 | 1.52 | 2.38 |
| | | | | 40 | 4.17 | 1.88 | 2.23 |
| Example 3 | — | 155 | 405 | 20 | 1.87 | 0.73 | 2.58 |
| | | | | 30 | 2.19 | 0.88 | 2.50 |
| | | | | 40 | 2.71 | 1.19 | 2.28 |
| Example 4 | — | 189 | 406 | 40 | 2.06 | 0.83 | 2.50 |
| | | | | 50 | 2.67 | 1.09 | 2.45 |

[1)] Oxygen permeation coefficient ($cm^3$(STP) · cm/$cm^2$ · sec · cmHg)
[2)] Nitrogen permeation coefficient ($cm^3$(STP) · cm/$cm^2$ · sec · cmHg)
[3)] $PO_2/PN_2$

What is claimed is:

1. A separation membrane comprising a resin being constituted of the repeating unit represented by the general formula (I) and having a number average molecular weight of not less than $1 \times 10^3$ in polystyrene equivalent:

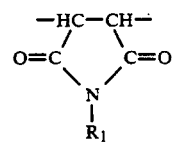

where $R_1$ denotes an alkyl group of 1-20 carbons, a fluoroalkyl group of 1-20 carbons, or a group represented by the general formula: —(—X—)$_m$—(SiR$_2$R$_3$—)$_n$—R$_4$, or —(—X—)$_m$—(—SiR$_2$R$_3$O—)$_n$—SiR$_4$R$_5$R$_6$ (wherein X is an alkylene group of 1-8 carbons or a phenylene group of 6-12 carbons; m is 0 or 1; n is an integer of 1-20; $R_2$, $R_3$, carbons, selected from an alkyl group, a cycloalkyl group, a phenyl group, an alkoxyl group, and a fluoroalkyl group, and may be the same with or different from each other).

* * * * *